United States Patent [19]

List

[11] 4,377,993

[45] Mar. 29, 1983

[54] INTERNAL COMBUSTION ENGINE

[76] Inventor: Hans List, 126, Heinrichstrasse, Graz, Austria

[21] Appl. No.: 263,906

[22] Filed: May 15, 1981

[30] Foreign Application Priority Data

May 28, 1980 [AT] Austria ................................ 2841/80

[51] Int. Cl.[3] ........................ F02F 7/00; F02M 33/02; F02B 77/00; F16M 1/02

[52] U.S. Cl. ............................ 123/198 E; 123/195 R; 123/195 C; 123/195 H

[58] Field of Search ........... 123/198 E, 195 H, 195 A, 123/195 R, DIG. 6, DIG. 7, 195 C, 195 S

[56] References Cited

U.S. PATENT DOCUMENTS

| | | | |
|---|---|---|---|
| 4,093,322 | 6/1978 | Koskuba | 123/195 H |
| 4,183,344 | 1/1980 | Kirchweger et al. | 123/198 E |
| 4,213,439 | 7/1980 | Feichtinger et al. | 123/195 E X |
| 4,213,440 | 7/1980 | Abe et al. | 123/195 C |
| 4,230,087 | 10/1980 | Abe et al. | 123/195 C X |
| 4,280,453 | 7/1982 | List et al. | 123/195 R |
| 4,313,405 | 7/1982 | Skatsche et al. | 123/195 C |
| 4,338,889 | 7/1982 | Kirchweger et al. | 123/198 E |
| 4,343,271 | 8/1982 | Skatsche et al. | 123/198 E |

*Primary Examiner*—Wendell E. Burns

*Attorney, Agent, or Firm*—Watson, Cole, Grindle & Watson

[57] ABSTRACT

In an internal combustion engine an engine unit support is attached to an engine housing which is extended in upward direction. The two-part crankshaft bearings are attached to the engine unit support such that their upper part is fastened to the upper part of the engine unit support by mounting screws which can be handled from above and outside of the engine housing. The assembly unit which consists of crankshaft and crankshaft main bearings is supported in the engine housing by means of sound insulating elements. The whole design thus facilitates assembly and disassembly of the engine.

5 Claims, 3 Drawing Figures

INTERNAL COMBUSTION ENGINE

BACKGROUND OF THE INVENTION

The present invention relates to an internal combustion engine whose engine unit support, including cylinder block, cylinder head and accessory assemblies attached to the latter, carries the two-part crankshaft main bearings and is attached to the engine housing which extends upwards beyond the axis of the crankshaft.

DESCRIPTION OF THE PRIOR ART

A similar type of combustion engine is described in Austrian Pat. No. 343.958. It comprises a cylinder block, including crankshaft bearings, cylinder head and accessory units, which is connected to the upper edge of the upwardly extended crankcase by means of a flange running around the cylinder block at the level of the water jacket. The whole assembly is fastened with screws. This arrangement results in one single noise-bearing connection between the crankcase, which has by far the largest sound-emitting surfaces, and the cylinder block. This connection is established by the connecting flange, which is located at the level of the water jacket and is therefore exposed to a very low level of structure-born noise. Besides, the connection is located relatively far away form the crankshaft main bearings which are the primary noise sources. The disadvantage of this known type of design is, that the efforts for assembly and disassembly are increased, as, if e.g. cylinder block and cylinder head are cast in one piece, an inspection of the pistons or replacement of the piston rings or examination of the valve seats will require either the removal of the engine unit support along with crankshaft and main bearings or the provision of an access opening in the crankcase for the main bearing screws, which would entail further expense.

Another example is given in German Laid Open Print No. 2 612 182. In this case engine unit support and cylinder head form a single unit which is supported by the crankcase or the flywheel casing, respectively, by means of at least one element insulating against structure-born sound. This element, which may be frame-shaped, can simultaneously be used for sealing purposes. It would also be possible to fasten the sound-insulating elements to the crankcase walls on the one side and to the engine unit support, i.e. to the walls of the main bearings in the area of the crankshaft axis, on the other, with a separate sealing along the upper edge of the crankcase. With respect to structure-born sound, both designs will guarantee a complete separation of the noise-generating parts and the engine housing consisting of crankcase and, if existing, flywheel housing, without impairing the power flow between cylinders and main bearings by the use of flexible linkages. By loosening the elastic fastening the entire engine unit support can be lifted out of the crankcase, which permits easy access to and removal of pistons and valves. Since the upper part of the crankshaft bearings and the bearing walls extending downwards beyond the lower ends of the cylinders consist of a single piece, and since the lower part of the main bearings is screwed to the engine unit support or to the upper parts of the bearings, respectively, from below, the engine crankcase must be accessible from below to allow disassembly of the engine unit support without removing the crankshaft. This can be achieved either by opening a cover in the lower area of the crankcase or by disassembling the crankcase, which in turn will increase the expense in manufacture and maintenance.

SUMMARY OF THE INVENTION

It is an object of the present invention to improve internal combustion engines of the abovementioned type in such a way as to facilitate manufacture and to simplify assembly and disassembly of the engine unit support including the crankshaft main bearings, while at the same time maintaining the arrangement of bearings and fastenings used to hold it in the crankcase, as this type of set-up is characterized by its good sound-absorbing qualities.

The present invention achieves this by fastening the upper part of each of the crankshaft main bearings to the upper part of the engine unit support extending down to the lower end of the cylinders with a set of mounting screws. These screws are accessible from above and from outside of the engine housing, and are preferably arranged symmetrically to a plane including the cylinder axes. The assembly unit, which consists of said crankshaft and said crankshaft main bearings and remains in the engine housing after loosening said mounting screws and lifting off the upper part of said engine unit support is connected to said engine housing via elements insulating against structure-born sound. This allows the engine unit support to be disassembled and removed from the engine housing from above, without necessitating removal of the crankshaft and its bearings at the same time, and without need for an oil-tight opening on the lower side of the engine housing. In short, after loosening the mounting screws of the crankshaft bearings the engine unit support can be lifted off, while the crankshaft including the two parts of its main bearings will remain in the engine housing along with piston rods and pistons. For an inspection and replacement of pistons and piston rings it will suffice to remove the upper part of the engine unit support after loosening the mounting screws of the main bearings. This will also facilitate service and maintenance of the valves and valve seats in the upper part of the engine unit support, which may also comprise the cylinder head.

The invention is applicable both to internal combustion engines with a one-piece cylinder block/cylinder head, and to those whose cylinder head is fastened to the cylinder block with screws. In the one-piece variant, a design according to the above description permits inspection of the working surface of the piston, replacement of the piston rings and checking of the valves without necessitating removal of the engine or of the majority of its components, e.g. from a vehicle it powers. The other variant, with the cylinder head and cylinder block forming two separate parts, still offers the advantage of an easy replacement or inspection of the pistons and piston rings.

A further enhancement of the present invention would aim at securing the upper part of each of the crankshaft bearings in its position relative to the upper part of the engine unit support by using additional fitting elements, e.g. pins, fitting surfaces or ground-in sleeves for the mounting screws. This will ensure precise and reproducible alignment of the crankshaft bearings relative to the upper part of the engine unit support, thereby facilitating assembly and disassembly of the engine without impairing the quality of the crankshaft bearings.

According to another variant the mounting screws are positioned in parallel to the cylinder axis (axes), with recesses for their insertion along the sides of the engine unit support. It is thereby possible to mount the crankshaft bearings or their upper parts without broadening the engine unit support and thus the entire engine.

Another version of the present invention suggests that the axes of the mounting screws run from the sides of the engine unit support towards the symmetry-plane of the engine at an acute angle. This would simplify manufacture of the engine unit support, as it would permit the necessary holes to be drilled while yet on the transfer line; furthermore, assembly and disassembly of the engine unit support would be easier and the length of the mounting screws could be chosen more freely as they could be simply removed from above.

DESCRIPTION OF THE DRAWINGS

Following is a more detailed description of exemplary embodiments of the invention as illustrated by the enclosed drawings, wherein.

DESCRIPTION OF THE PREFERRED EMBODIMENTS

Figure 1:
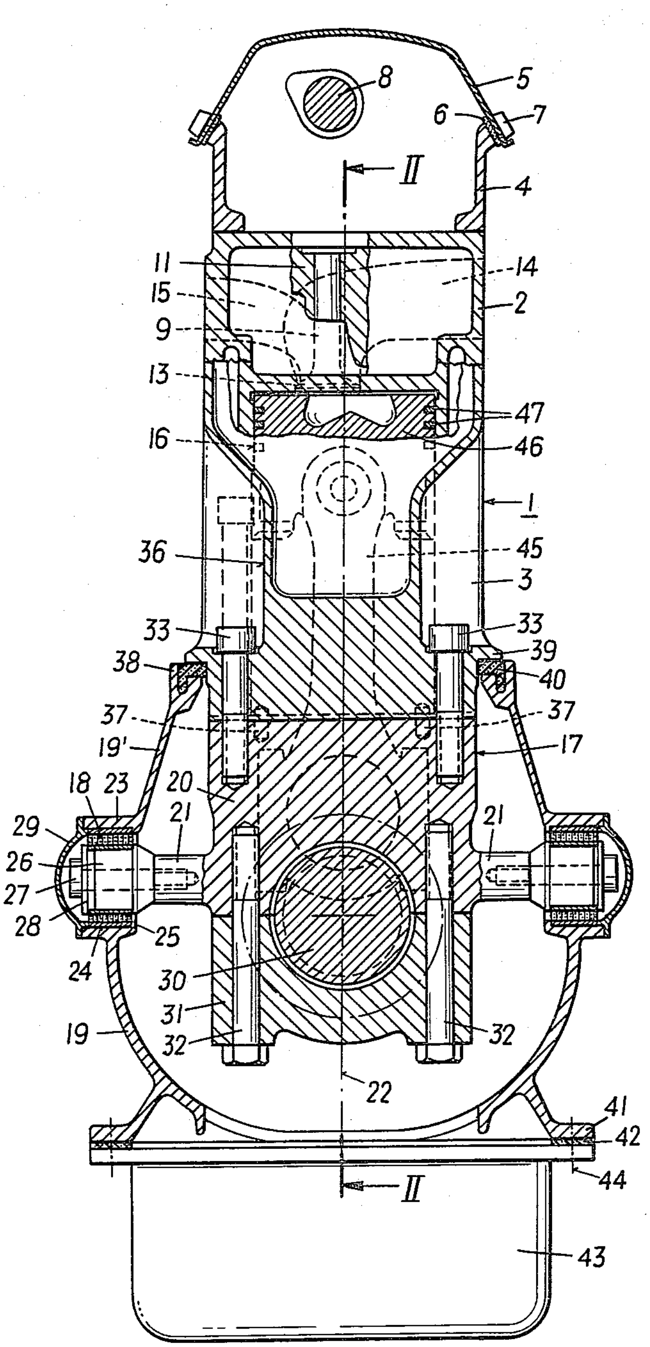
FIG. 1 is a cross-sectional view of an internal combustion engine designed according to the present invention.
Figure 2:
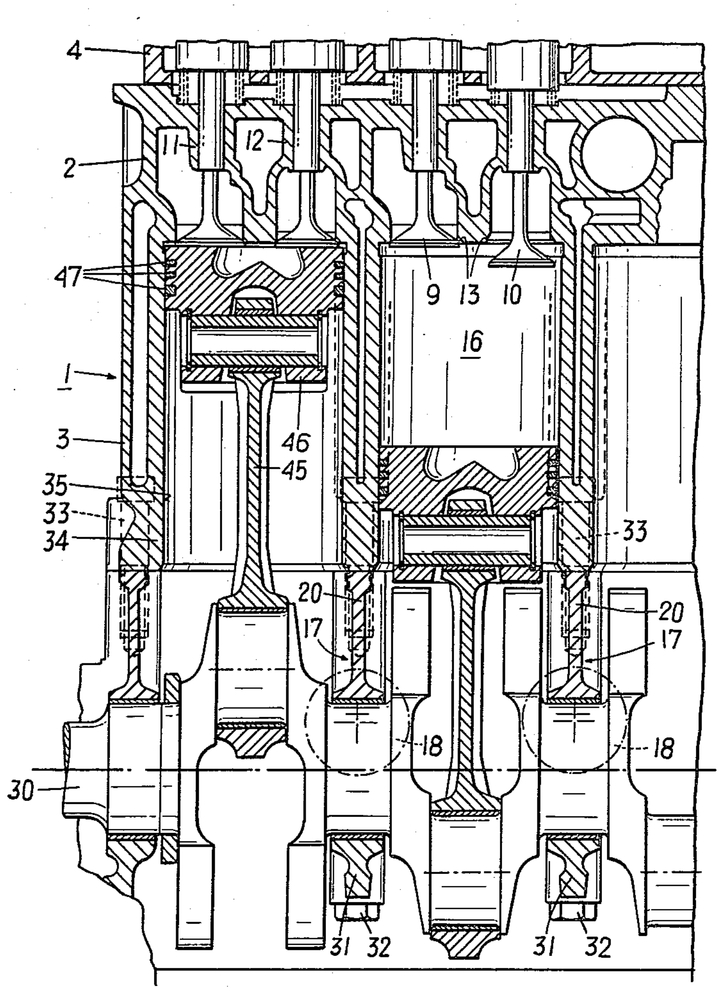
FIG. 2 is a sectional view along line II—II in FIG. 1.

The multicylinder internal combustion engine represented in FIGS. 1 and 2 shows an engine unit support 1 whose upper part comprises a one-piece cylinder block 3/cylinder head 2 unit, which is water-cooled, and accessory assemblies attached to this unit (not shown). The top side of the cylinder head 2 is covered by a casing 4, which is closed by a cover 5 and protected from the ingression of oil by means of a seal 6. The cover is held by screws 7. The casing 4 contains a camshaft 8, which activates inlet and outlet valves 9, 10. The inlet/outlet valves 9, 10 are guided by valve sleeves 11, 12 in the cylinder head 2. Together with the valve seats 13 they close the inlet and outlet channels 14, 15 of the engine against the cylinder chamber 16.

The engine unit support 1 shows crankshaft bearings 17 at its lower end and is connected to the crankcase by means of sound-insulating elements 18, which are attached to the crankcase walls 19 on the one side and to the upper part 20 of the crankcase bearings 17 on the other. The upper parts 20 of the main bearings or of some of them are provided with projections 21 on both sides, which extend to the walls of the crankcase 19 at a right angle to the cylinder axis 22. Opposite these projections 21 the crankcase walls 19 shows bulges 23 and are provided with bores 24 for insertion of the cylindrical sound-insulating elements 18. The standard sound-insulating elements 18, which are cylinder-shaped and made of rubber-bonded metal, are fitted into the bores 24 and held in place by a collar 25 at the inner end of each bore. The sound-insulating elements 18 are slipped on to a cylindrical connecting piece 26, which is attached to the projections 21 of the upper parts 20 of the crankshaft bearings 17 by means of a screw 27 and plate 28. The bores 24 in the bulges 23 of the crankcase walls 19 are covered by caps 29 made of thermoplastic material.

The crankshaft bearings 17 are split in the plane of the axis of the crankshaft 30. The lower part 31 is bolted to the upper part 20 by means of bearing screws 32, while the upper part 20 is attached to the upper part of the engine unit support 1, or the cylinder block, respectively, with a set of mounting screws 33, with the dividing plane lying below the lower end 34 of the cylinders 35. The mounting screws 33 are positioned parallel to the cylinder axes 22. The sides of the engine unit support 1 and of the cylinder block 3 are provided with recesses 36 for handling the mounting screws. These recesses 36 extend in the axial direction of the mounting screws 33, which permits unhindered insertion of the screws—as indicated in FIG. 1 by a broken line on the left.

In addition to the bearing screws, the upper part 20 of each of the crankshaft bearings 17 is held by fitting pins 37 to secure its position relative to the joint surface on the engine unit support 1. This will guarantee precise and reproducible alignment of the parts, thereby facilitating assembly and eliminating inaccurate mounting of the crankshaft.

In the area of the upper edge 38 of the crankcase 19' the engine unit support 1 carries a flange 39, which, together with a gasket 40 along the upper edge 38, seals the crankcase interior. This flexible seal 40 also will cope with the relative movements between engine unit support 1 and upper edge 38 of the crankcase 19', which are due to the flexible sound-insulating elements 18.

The lower end of the crankcase 19' carries another flange 41 which is used for attaching an oil-sump 43. This sump 43 is held by screws indicated by their axes 44 and sealed by a seal 42.

According to the present invention the upper part of the engine unit support 1 can be disassembled and removed from the crankcase 19' without removal of the crankshaft 30 and its main bearings 17. After loosening the mounting screws 33 of each of the main bearings 17 the entire top of the engine unit support 1 can be lifted out of the crankcase 19' from above, while the crankshaft 30 including parts 20 and 31 of the main bearings 17 along with piston rods 45 and pistons 46 will remain in or connected to the crankcase 19'. In order to inspect and replace the pistons 46 and the piston rings 47 and to grant access to the valves 9, 10 and valve seats 13, it will only be necessary therefore to lift off the upper part of the engine unit support 1 which has been separated from the main bearings 17 by loosening the mounting screws 33. The oil sump 43 may remain fastened to the crankcase or engine housing 19', which will be of advantage with regard to maintenance and service, e.g. if an engine built into a vehicle has to be overhauled.

FIG. 2 shows the combustion engine without the oil sump. The positioning of the mounting screws 33 in the central plane of the crankshaft bearings 17 and the location of the dividing plane between the crankshaft bearings 17 and the upper part of the engine unit support 1 or the cylinder block 3, respectively, are also shown in this Figure. The position of the sound-insulating elements 18 in the area of the crankshaft bearings 17 is indicated by a broken line.

Figure 3:
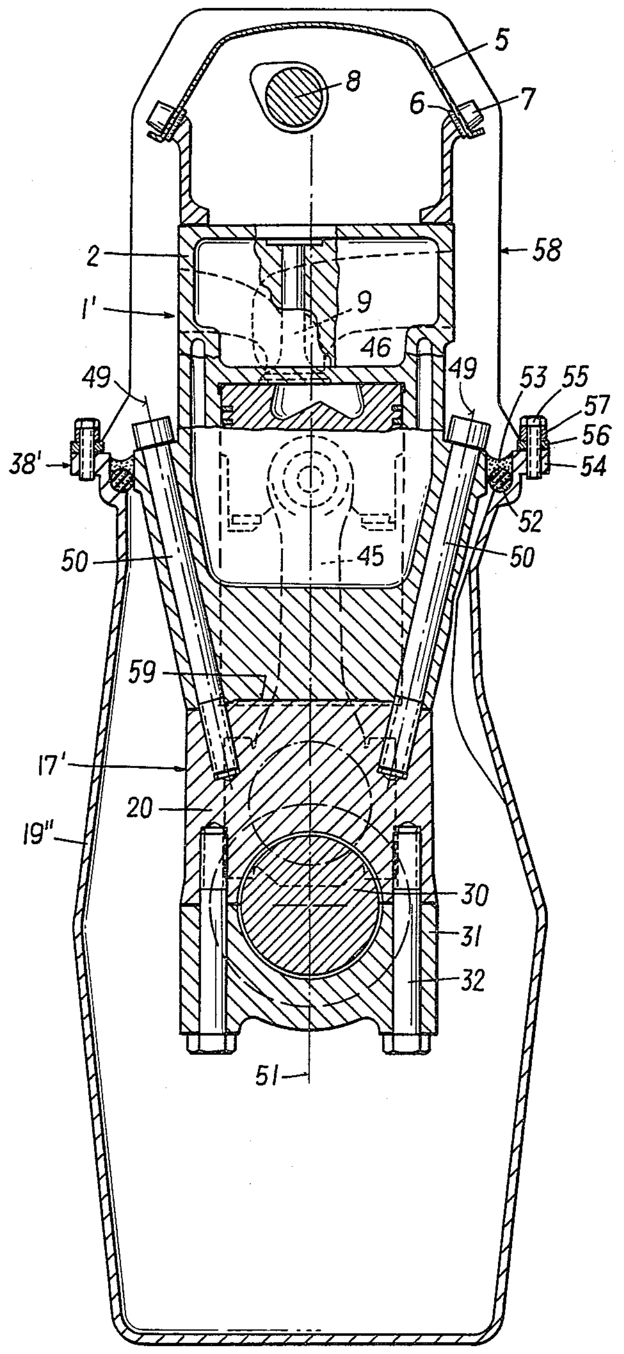
FIG. 3 is a cross-sectional view of another embodiment of this invention.

FIG. 3 shows schematically another embodiment of the present invention, which differs from the former example presented in FIGS. 1 and 2 mainly by the positioning of the mounting screws. Starting from the sides of the engine unit support 1' the axes 49 of the mounting screws 50 form acute angles with the symmetry plane 51 (defined by the cylinder axes) of the engine. This eliminates the need for special recesses for insertion of the screws, and allows the bores for the mounting screws 50 on the engine unit support to be drilled from above directly on the transfer line. Moreover, the length of the mounting screws 5 can be chosen more freely and better access to the screw-heads is offered.

The engine unit support 1' is supported in the engine housing 19'', which is closed at the bottom (not shown). The gap at the upper edge 38' is sealed by inserting a rubber seal 52 and filling the resulting groove with a vulcanization-curing material 53.

A sound-insulating casing 58 is mounted by means of screws 55 to the flange 54 on the upper end 38' of the motor housing 19', with flexible sealing elements 56, 57 in between. The casings 58 will enclose that part of the engine unit support 1' protruding from the engine housing 19'' as well as accessory assemblies attached to the engine unit support 1' (not shown), and will provide further noise protection. The upper part 20' of the crankshaft bearings 17' is aligned by a joint surface 59 against the upper part of the engine unit support 1', in order to facilitate assembly.

Apart from the above details of design the internal combustion engine shown in FIG. 3 is substantially identical with that of FIGS. 1 and 2. The measures required for disassembling and removing the upper part of the engine unit support 1' have already been discussed in detail in the description concerning FIGS. 1 and 2.

I claim:

1. An internal combustion engine, with an engine unit support comprising a cylinder block, cylinder head and accessory assemblies attached to the latter, wherein said engine unit support carries two-part crankshaft main bearings and is attached to an engine housing which extends upwards beyond the axis of the crankshaft, an upper part of each of said crankshaft main bearings is fastened to an upper part of said engine unit support underneath the lower end of the cylinders of said cylinder block with a set of mounting screws, said mounting screws are accessible from above and from outside of said engine housing, and wherein the assembly unit which consists of said crankshaft and said crankshaft main bearings and remains in the engine housing after loosening said mounting screws and lifting off the upper part of said engine unit support is connected to said engine housing via elements insulating against structure-born sound.

2. An internal combustion engine according to claim 1, wherein said mounting screws are arranged symmetrically to a plane including the cylinder axis (axes).

3. An internal combustion engine according to claim 1 or 2, wherein said upper part of each of said main bearings is secured in its position relative to said upper part of said engine unit support by the additional use of fitting elements, e.g. fitting pins, fitting surfaces or ground-in fitting sleeves for the mounting screws.

4. An internal combustion engine according to any of the preceeding claims, wherein said mounting screws are positioned parallel to the cylinder axis (axes), and recesses are provided for their insertion at the sides of said engine unit support.

5. An internal combustion engine according to any of claims 1 to 4, wherein, starting at the sides of said engine unit support the axes of said mounting screws form acute angles with the symmetry plane of the engine.

* * * * *